(12) United States Patent
Zhang et al.

(10) Patent No.: US 6,253,116 B1
(45) Date of Patent: Jun. 26, 2001

(54) METHOD AND APPARATUS FOR RAPID FREEZING PROTOTYPING

(75) Inventors: Wei Zhang, Kearny; Ming C. Leu, Pine Brook; Zhiming Ji, Newark, all of NJ (US); Yongnian Yan, Bejing (CN)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 09/128,805

(22) Filed: Aug. 4, 1998

(51) Int. Cl.[7] .................................................. G06F 19/00
(52) U.S. Cl. ............................................ 700/119; 700/123
(58) Field of Search ................................... 700/123, 119, 700/182

(56) References Cited

U.S. PATENT DOCUMENTS

| | | |
|---|---|---|
| 4,575,330 | 3/1986 | Hull .................................. 425/174.4 |
| 4,752,352 | 6/1988 | Feygin .................................. 216/33 |
| 4,863,538 | 9/1989 | Deckard .............................. 264/497 |
| 5,047,181 | 9/1991 | Occhionero et al. .................. 264/28 |
| 5,090,207 | 2/1992 | Gilbertson et al. ...................... 62/59 |
| 5,121,329 | 6/1992 | Crump .................................. 700/119 |
| 5,168,724 | 12/1992 | Gilbertson et al. .................... 62/430 |
| 5,236,637 | * 8/1993 | Hull .................................. 264/401 |
| 5,301,415 | * 4/1994 | Prinz et al. ............................ 29/458 |
| 5,340,433 | 8/1994 | Crump .................................. 156/578 |
| 5,389,196 | 2/1995 | Bloomstein et al. .................. 216/66 |
| 5,641,391 | 6/1997 | Hunter et al. ........................ 205/80 |
| 5,810,988 | * 9/1998 | Smith, Jr. et al. .................... 204/666 |
| 5,876,550 | * 3/1999 | Feygin et al. ........................ 156/264 |
| 5,900,207 | 5/1999 | Danforth et al. .................... 264/603 |

OTHER PUBLICATIONS

Jocobs, Stereolithography and other RP & M Technologies, ASME Press, pp. 1–25.
Gavrilin, 1994, Liteinoe Proizvodstvo, 9:14–5(English Abstract).

* cited by examiner

*Primary Examiner*—William Grant
*Assistant Examiner*—Chad Rapp
(74) *Attorney, Agent, or Firm*—Klauber & Jackson

(57) ABSTRACT

A method and apparatus for forming three-dimensional patterns by depositing a crystalloid material onto substrate in a layer by layer fashion. The apparatus includes a computer responsive for controlling the material depositing rate and the three-dimensional relative movement between the depositing head and the substrate. The controlling information comes from the sliced CAD model of the part. For each cross-section, the depositing head plots the boundary and the interior while the building material comes out of the head. The crystalloid material deposited on the substrate or previous layer of the part rapidly freezes forming a new layer of the part. The material can be deposited by a continuous extruding device or a drop-on-demand device. Where necessary, support structure is built in the same way but with material of a different melting point. The ambient temperature is accurately controlled to a certain low point in order to make the deposited material flow to a certain extent and freeze after a short time. The preferred crystalloid material is water or brine which does not pollute the environment. However, the invention encompasses the use of other crystalloid materials.

12 Claims, 15 Drawing Sheets

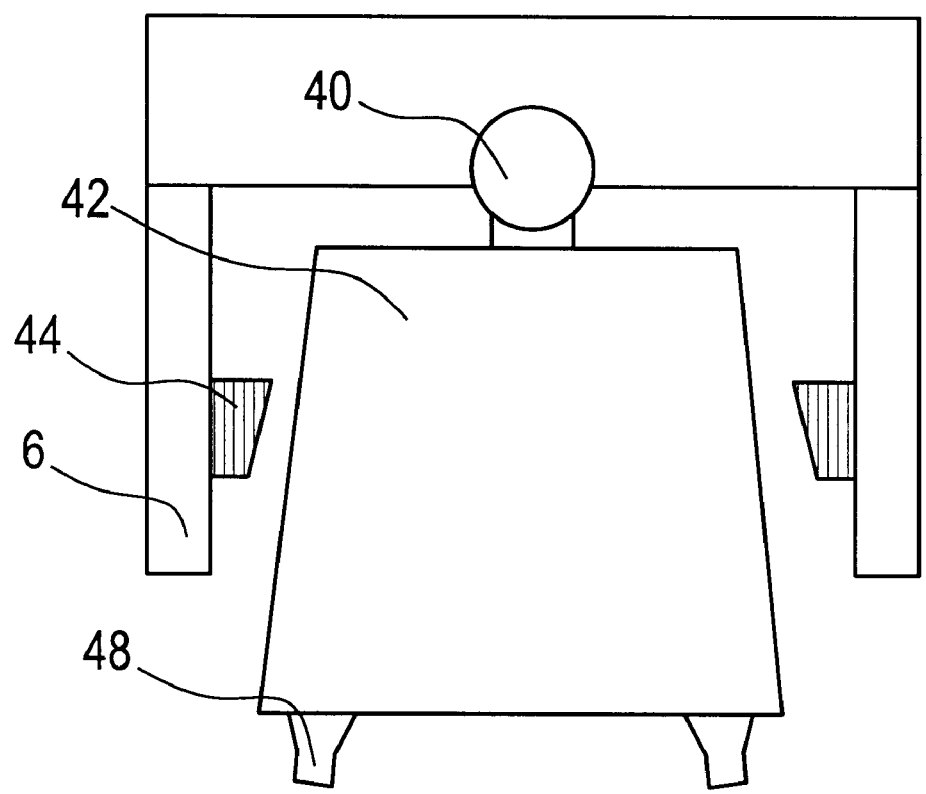

Ratio too large   Normal ratio   Ratio too small

The schematic drawing of strands for different levels of the ratio of material flow rate XY scanning speed

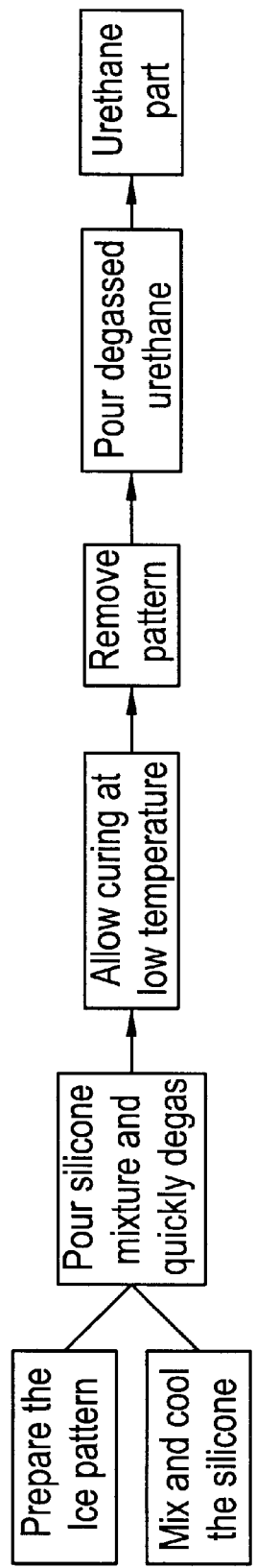

Typical cooling curve in RFP

Comparison of typical cooling curves of deposited material in RFP and FDM

Typical cooling curve in FDM

Comparison of typical cooling curves of deposited material in RFP and FDM

METHOD AND APPARATUS FOR RAPID FREEZING PROTOTYPING

BACKGROUND OF THE INVENTION

1. Field of the Invention

The present invention relates generally to a method and apparatus for Rapid Freezing Prototyping and more particularly to a method and apparatus for building ice patterns according to a predetermined design by selectively depositing and freezing water layer by layer in a controlled manner.

2. Description of the Relevant Art

Presently, there exists-three general categories which mankind has used for tool building. One of the earliest and most popular categories is known as machining, which includes, for example, milling, lathe cutting, drilling, grinding, flame cutting, and electric discharge machining. The common feature found in this category is material removal. All machining methods begin with work pieces in which the shape of the part is achieved by either manually or automatically controlling the tool path relative to the work piece to remove material from the piece until the desired result has been reached. The second category for making parts is forced forming, for example by injection molding, various kinds of casting and forging. The common feature of this method is that a cavity or mold corresponding to the shape of the part to be made in which the shape of the part is accurately or near accurately copied from the shape of the cavity or mold by making the material flexible. The third category for making parts utilizes solid free form fabrication (SFF), also known as rapid prototyping, which emerged in the mid 1980's. The common feature of SFF is that material added in a layer-by-layer manner until the shape of the part to be built is achieved by accurately controlling the building paths of layers.

Both machining and shape copying methods are methods that are particularly well suited for large-scale production. However, where only a small number of parts are desired (e.g., 1–10), such conventional methods are deficient because they usually involve a large initial expense for labor, setting up of the machining protocols, tools or molds. Furthermore, because of complexity limitations in machining, a very complex part must usually be divided into several segments that are built separately and then later assembled.

To overcome these difficulties SFF processes have been developed in which the cost of part building does not depend on the quantity and even the complexity of the part. It is especially suitable for new product design and development, such as design visualization, form fit, functional testing and rapid tooling in order to make fully functional parts. Conventional SFF processes include Stereolithography, Laminated Object Manufacturing, Fused Deposition Modeling, and Selective Laser Sintering. These SFF processes all use the same concept of building three-dimensional objects in a layer-by-layer manner. However, the methods for building each layer and the materials required are different for each type of SFF process.

Some known SFF processes are disclosed as follows:

In the U.S. Pat. No. 4,575,330, an ultraviolet (UV) laser beam is focused on the surface of liquid photo curable resin. The resin exposed to UV laser radiation will change rapidly from liquid to solid state. The beam is accurately directed by the computer according to the cross-sectional information of the CAD model. However, the curable photopolymer used in the process is hazardous. Casting with the patterns made by this technology is somewhat difficult because the cured material expands and evaporates hazardous fumes rather than melts when heated.

In U.S. Pat. Nos. 5,121,329 and 5,340,433, a non-laser SFF process is disclosed that uses a heated working head to melt and deposit the material onto a substrate to build a part. The material comes out of the nozzle of the head and then rapidly solidifies and adheres to the previous layer or substrate. The temperature of the heated material and the ambient is precisely controlled in order to make the deposited material solidify very rapidly. Wax and ABS plastic are found to be especially suitable for this process. However, plastic is not suitable for tooling. Wax patterns can be directly used for investment casting, but the accuracy of the wax patterns is not as good as plastic patterns. Moreover, this process has some difficulties in controlling the heat accumulation and layer bonding. The build speed is also very slow as compared to other SFF processes. Higher building speed usually results in more serious heat accumulation, worse accuracy and surface finish.

In U.S. Pat. No. 4,863,538, a sintering process (called SLS), uses a $CO_2$ laser beam directed to selectively sinter a powder according to cross-sectional information provided by a computer. This process has the potential to build parts with a wide variety of materials, e.g., plastic, wax, ceramic and metal, etc. However, this process also has heat accumulation problem, especially when building parts with a high melting point material. Currently, in order to build metal parts with this technology, high temperature post sintering or metal infiltration is necessary. However, these kinds of post sintering techniques are believed to cause part shrinkage or loss of surface finish.

In U.S. Pat. No. 4,752,352, another laser layered building process is introduced using a $CO_2$ laser beam that is directed to cut contours on a sheet of material to make each layer of a 3D solid model. The layers are bonded together with adhesives coated on the back of the sheet material. The main disadvantage of this process is that it is not convenient to make metal functional parts with the patterns made of this technology. Furthermore, the cutting process produces a lot of hazardous smoke and results in a surface finish that is also poorer as compared to SLA parts.

Broadly speaking, the current SFF processes have made great successes in rapid prototyping as well as rapid tooling. Layered material additive manufacturing has been rapidly taken from a concept to an established commercialized manufacturing alternative. However, to further improve the industrial application of this technology, some basic problems need to be solved, such as the high cost of SFF machinery and material, poor part accuracy and surface finish, process or material pollution, and difficulties in making metal parts or molds with the SFF prototypes.

Thus, a need exists for reducing system cost, improving building speed, accuracy, surface finish and also for developing new SFF processes that are cleaner to the environment.

OBJECTS AND SUMMARY OF THE INVENTION

It is an object of the present invention to provide an improved surface finish of a prototype without the need of polishing the surface of the prototype.

Another object is to provide improved part removal from layered prototype material.

It is yet another object to improve part joining.

It is an advantage of the present invention to provide cheaper and cleaner prototype building technique.

It is another advantage of the present invention to build accurate ice parts with excellent surface finish.

It is yet another advantage of the present invention to provide easy removal of a part from a mold simply by warming it up and making the mold dry in which there is no residue problem.

It is another advantage of the present invention to eliminate the problem of heat accumulation.

In accordance with the objects and advantages of the present invention, a system for use in rapid freezing prototyping, using at least one crystalloid material, such as water, capable of transitioning between liquid and solid states at a threshold temperature is disclosed. The system comprises a material transfer system having a material supply subsystem and a material deposition sub-system in communication with the supply sub-system. A three-dimensional spatial positioning sub-system is connected to the material deposition sub-system and operative to position the sub-system at a plurality of points within a predetermined region. And, a freezing chamber having an interior chamber defining the predetermined region. Whereby the material transfer system directs the material in the liquid state through the material extruding subsystem to the deposition sub-system. The positioning subsystem is adapted to position the deposition sub-system at one of the points. The deposition sub-system is adapted to maintain the material at least one liquid state temperature proximate to the threshold temperature and depositing the material within the freezing chamber. The chamber causes the material to have a solid state temperature by lowering the temperature of the material from the liquid state through the threshold temperature to the solid state temperature; thereby forming a layer of material.

The present invention can be more fully understood by reference to the following description and accompanying drawings, which form an integral part of this application:

BRIEF DESCRIPTION OF THE DRAWINGS

In the Drawings:

FIG. 5C is a diagrammatic representation showing a way of changing tips of the nozzle.

FIG. 10 is a flow chart of a process for silicon molding with ice patterns.

DETAILED DESCRIPTION OF THE PREFERRED EMBODIMENT(S)

Figure 1:
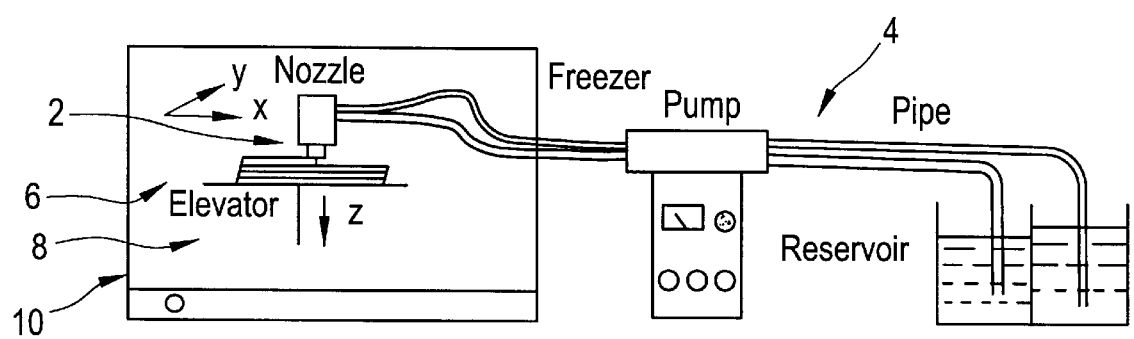
FIG. 1 is a diagrammatic representation of a system for rapid freezing prototyping with nozzle tip depositing water in a freezing chamber.

With reference to the drawings for purposes of illustration, the system of the present invention includes generally a material supply subsystem from which a crystalloid material such as water or the like, is stored and supplied for the rapid freezing prototyping (RPF) process. A material deposition subsystem comprising a nozzle is in fluid communication with the supply subsystem. The nozzle connects to a conventional XYZ three-dimensional spatial positioning subsystem. The nozzle and spatial positioning subsystem are maintained in a freezing chamber that maintains the discharged crystallized material in a solid state. The crystallized material is capable of being transformed from a liquid state to a solid state when the temperature of the material passes below a threshold value.

The material supply subsystem pumps repetitively a desired amount of water from the reservoir into the nozzle and then deposits it onto the building surface. This function is achieved by utilizing a peristaltic pump, which uses rollers to squeeze the liquid through a flexible plastic tube. One end of the tube is inserted into the container of the building material, and the other end attached to the nozzle. The advantages of extruding water by a peristaltic pump include: (a) accurate metering of the liquid volume; (b) simplified maintenance due to the fact that there is no contact between the pump mechanism and the liquid and (c) the pump has multiple channels which can be used for supplying different crystalloid materials. For example, materials having different colors or different freezing points which allows for the use building materials and support materials as will be described later. The supply speed of the pump is controlled by the pulses generated by the motion controller.

The material-depositing-subsystem nozzle preferably has multiple tips which are designed for various types of requirements such as depositing building material, depositing support material and fast material depositing to improve build speed. The tip selection is accomplished by activating an electromagnet on an outside portion of the nozzle which operatively cooperates with natural magnets located in the multiple nozzle head to rotate the selected nozzle in a deposition position. In order to prevent the material in the nozzle and the pipe from overcooling to freeze, some heating components (not shown) are employed to keep them at a certain temperature, typically around 5 degrees Celsius when the crystalloid material is water.

The whole system will be controlled by a personal computer (Pentium-200 MHz). The three-axis movement and the peristaltic pump are controlled by a PC-Bus based 4-axis stepping motor controller. The software preferably utilizes conventional computer-aided-design software capable of generating conventional Numerical Control (NC) codes according to the sliced contour information of the CAD model on the computer. The stepping motor controller uses the NC codes to control the motion of the elevator in Z direction and the nozzle in X and Y directions. The peristaltic pump is also controlled by this motion controller.

A support removal subsystem is included which cooperates with the computer and freezing chamber to remove the supports from the prototype through temperature control of the solvent. The removal subsystem requires that a first crystalloid material such as water be as a building material and a second crystalloid material such as brine be used as a support material. The brine has a lower freezing temperature than water, thus as the temperature of the freezing chamber is raised above the threshold freezing temperature for brine the support material melts away leaving the building material in its frozen state. It will be appreciated that this procedure may be duplicated for prototypes in which it is desirable different building materials at different stages. Other crystalloid materials may be used such as ammonia and the like. Crystalloid materials as used in this specification are any material which transitions from a liquid state to a solid state at a predetermine threshold value for example water which transitions at 0 degrees celsius. Although, crystalloid materials can include metals, it is preferred that the crystalloid materials be non-heat conductive. Non-conductive materials such as water or brine avoid the problems with ambient heat found in other SFF rapid prototyping techniques. The preferred material is water or brine which does not pollute the environment, but any other materials can be used with like properties The building mechanism, includes the nozzle, and a spatial positioning subsystem including an elevator and a robotic XY positioning table are located in a temperature controlled freezing chamber. The temperature is controlled by the computer-interfaced controller. However, the chamber temperature would correspond relative to the freezing point of the material used. For water and brine, the freezing chamber temperature may be in the range of −10 to −40 degrees celcius, and the preferred chamber temperature is controlled at −20 degrees Celsius. Generally speaking, lower temperature allows faster building of ice parts. The chamber may be filled with oil based fluid such that the lower end of the nozzle is submerged. The material discharged from the nozzle remains in the oil to prevent frost from forming on the outside of the material. The elevator raises a platform proximate to the lower end of the nozzle. As layers are added to the prototype the elevator lowers the platform thus keeping the nozzle within the desired distance of the solid state material.

The process starts from the 3D CAD model. A specially developed software or commercialized CAD software is used to slice the 3D CAD model into multiple layers. Each layer is defined as the shape of the cross section at a certain height in z direction. The cross-sectional information originally defines the boundaries of the layer. In order to control the part building process, some data treatment is needed, such as interior fill, support creation where necessary. This processed information is then used to automatically create the building paths in order to control the whole building process. Basically, the building paths include the paths to build the boundaries, the interior fills and the supports. These paths are expressed in Numerical Control (NC) code language of the NC system of this apparatus, which is ready to control the relative movement of the working head and the substrate in X, Y, Z directions and also the corresponding material flow rate in the working head. The material is controlled to deposit only at the places corresponding to the cross-sectional shape and at a rate precisely proportional to the resultant speed of XY movement. When a layer is finished, the working head moves upwards or the substrate moves downward a fixed distance which is equal to the layer thickness assigned by the user in CAD slicing. In such a way, the 3D solid physical model is built.

During the building of each layer, the working head is kept at a distance of layer thickness above the substrate or the previous layer. Advantageously, the material flows out of the working head through a nozzle at a constant rate while the working head moves in XY plane also at a constant resultant speed. The material will spread on the surface of the substrate or the previous layer when it flows out of the nozzle. However, the cold ambient, either oil or air, rapidly makes the material freeze as it is spreading, thus forming a line with a certain thickness and certain width in the case of continuous deposition. Because of the surface adhesion and surface tension effect, the thickness of the line can be controlled exactly equal to the distance of the working head above the substrate or previous layer. The line width is mainly determined by the ambient temperature, the material out flow rate and the resultant XY scanning velocity, in which the overall width of the nozzle tip in relation to the outflow aperture promotes the surface adhesion affect. Besides these four main factors, the path geometry and the layer thickness also have some effect on line width. Generally speaking, lower temperature, lower material flow rate and higher XY scanning speed will result in narrower line and vice versa. A good separation distance is 0.1–0.5 mm. The ratio of heat needed to cool the material corresponds in direct relation to volumetric rate of deposition, where the volumetric rate is proportional to the diameter of the nozzle outlet aperture multiplied by layer thickness, and scanning speed. The cooling rate is characterized by the diameter of the aperture of the nozzle and rate of scanning speed. The ambient is conditioned by a freezer.

In the drop-on-demand deposition method, the volumetric rate of deposited material is determined by the size of the drops and the dropping rate. The size of the drops is determined by many factors, such as the material viscosity, print head parameters, and the printing frequency. The layer thickness is closely related to the diameter of the drops. Hence, the drop-on-demand method can build very thin layers.

In another approach, the drop-on-demand method and continuous method can be concurrently wherein the drop-on-demand method is used to build the contour of each layer in order to improve the accuracy of the surface finish, the continuous method is used to build the fills of the part cross sections of each layer in order to improve the building speed.

Advantageously, the temperature is controlled at around −20° C. Preferably, the working head is mounted on an XY scanning mechanism driven by two motors. The substrate is mounted on a Z stage which is also driven by a motor. These three motors can be servomotors or stepping motors. The rotation of the motors is precisely controlled by the computer. The material in the working head is extruded out at a predetermined rate by a servo or stepping motor or peristaltic pump, or drop-on-demand.

As can be seen from the above description, the material used in this process is water. It is clean and cheap. Other important advantages of this process include: no expensive laser system, no material shrinkage during building, strong layer bonding. Parts can be made of different colors is another important advantage. Furthermore, the ice parts can be easily connected together which means that very complex parts can be divided into several simple parts to build and then connect them together.

Supports are made of brine or water of different color. If the supports are made of brine, then they can be removed after finished building by dipping the part with support in the oil of the temperature which is higher than brine ice's melting point but lower than pure ice's melting point. This is a support removal method using the difference of material melting point. If the supports are made of water with different color, then the supports can be removed manually. Some agent may be added in the water in order to obtain the desired freezing property of the material in this process, such as freezing point, viscosity.

Figure 2:
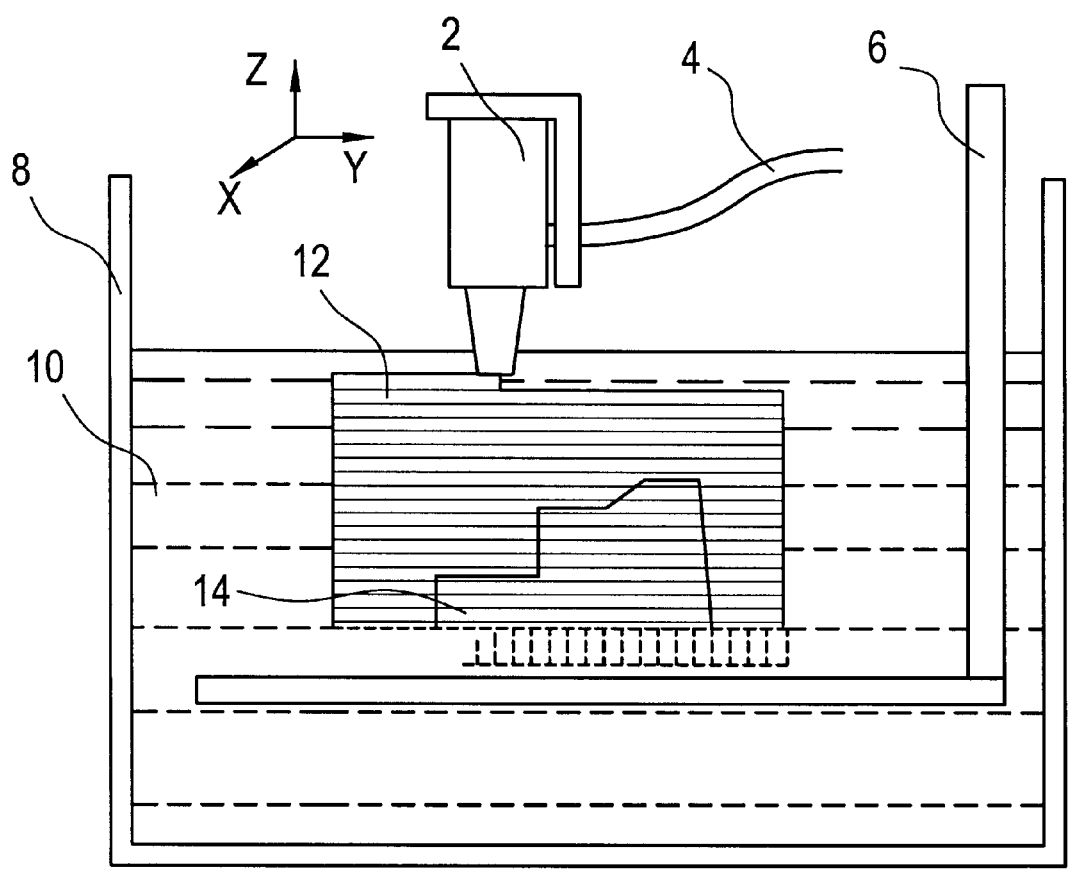
FIG. 2 is a diagrammatic partial representation of a system for rapid freezing prototyping with a nozzle tip depositing under oil surface in order to prevent frosting.

FIG. 1 shows a diagrammatic representation of a system for rapid freezing prototyping wherein a liquid material, such as water, is deposited in a freezing chamber. There are several ways to deposit the material onto the previous layer or substrate. For example, FIG. 2 shows a method of continuously depositing material in a kind of oil. To start with building and referring again to FIG. 1, elevator 6 lowers a distance of layer thickness, then the working nozzle 2 continuously deposits water while it is driven to scan by the XY table, the material flow and the XY scanning are both accurately controlled by the sliced information. When one layer is completed, the elevator 6 lowers another distance allowing the building of next layer. Referring again to FIG. 2, oil 10 contained in vat 8 is used to enforce the freezing speed and also to prevent frosting of water. Pipe 4 is used to feed the material from the reservoir to the working nozzle 2. For some geometry, such as cantilever, undercut, support structure 14 is need to support the part 12.

Figure 3A:
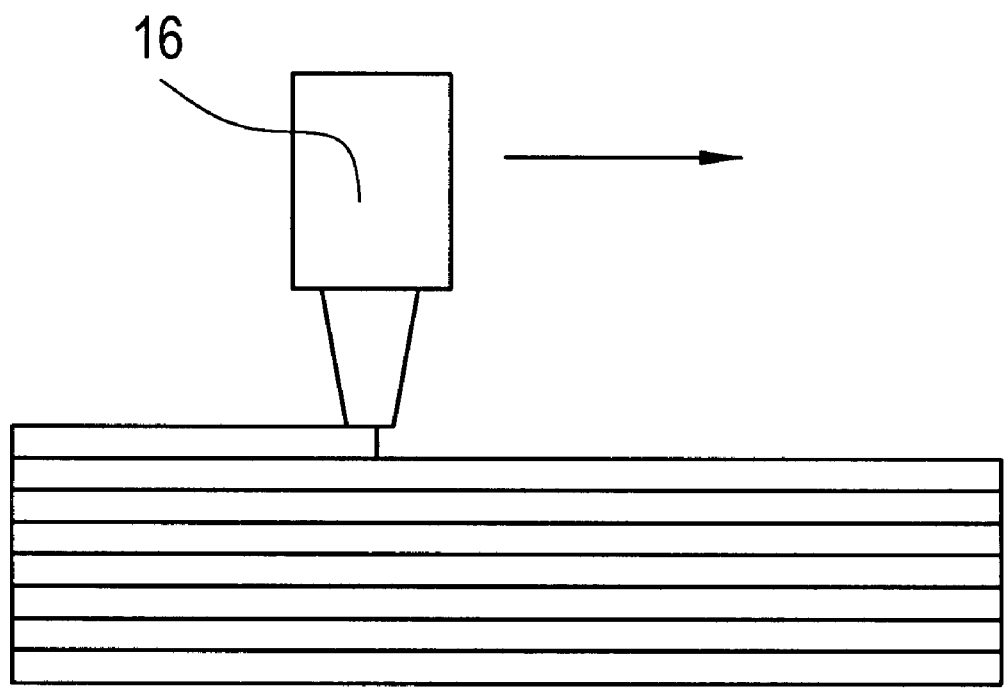
FIG. 3A is a diagrammatic partial representation of a system for rapid freezing prototyping as shown in FIG. 1 with a continuous depositing nozzle.

FIG. 3A shows another continuous method of depositing material. In this method, oil 10 and vat 8 are not used making the process simpler; however, the freezing speed of this method is expected to be smaller than the method shown in FIG. 2.

Figure 3B:
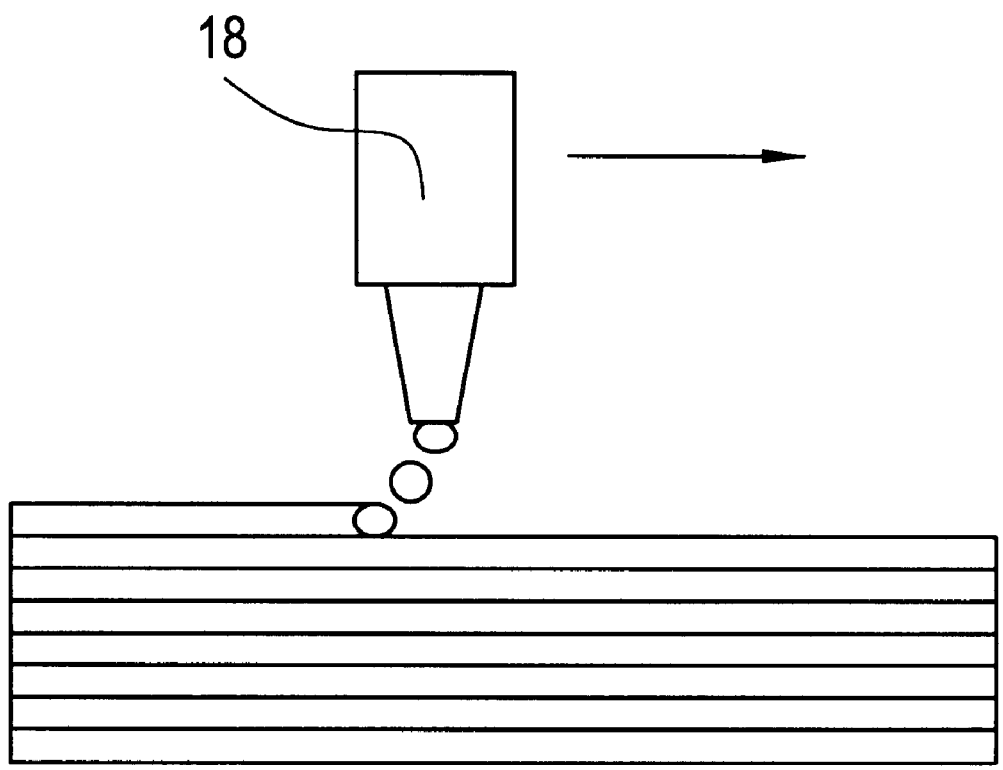
FIG. 3B is a diagrammatic representation of a system for rapid freezing prototyping as shown in FIG. 1 with a drop-on-demand depositing nozzle.

In addition, FIG. 3B shows a drop-on-demand method to deposit water by working nozzle 18. One way to generate such drops is to use piezoelectric ceramic or crystal. This method can be more accurate, but the building speed is smaller.

Figure 4:
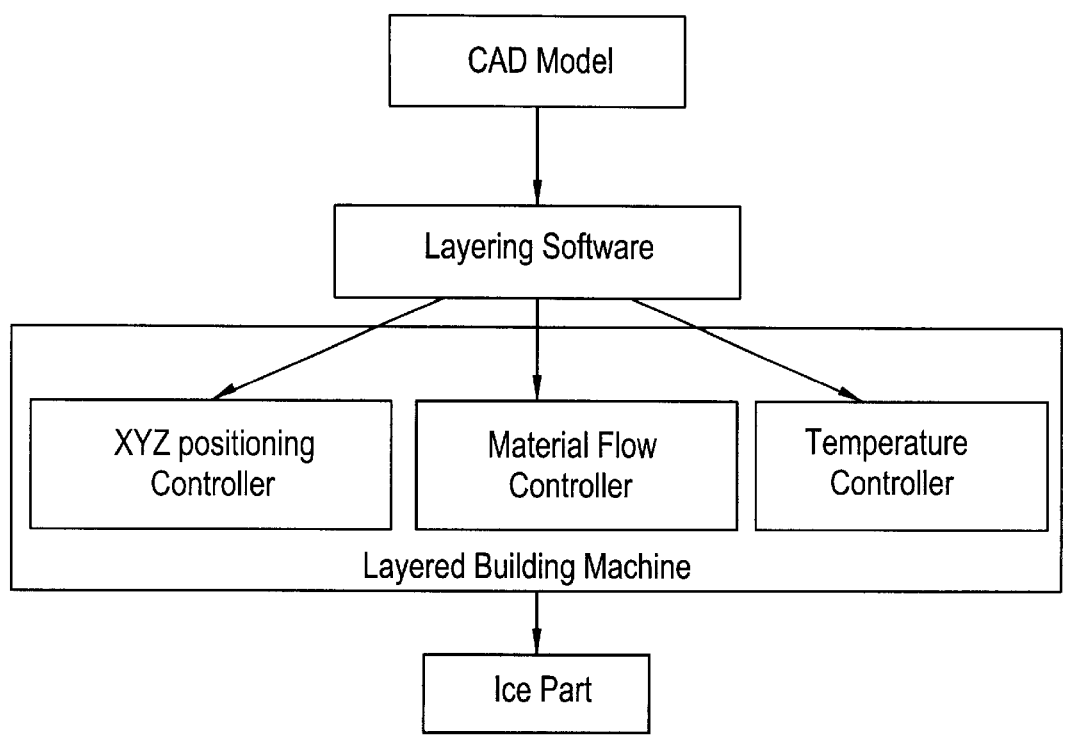
FIG. 4 is a flow chart of data treatment and machine control of the rapid freezing prototyping process.

FIG. 4 shows the data treatment and process control in this process. The CAD model is sliced by layering software in order to generate the cross-sectional information which will be used to control the building of ice parts. The controlling devices include XYZ positioning controller, material flow controller and the temperature controller.

Figure 5A:
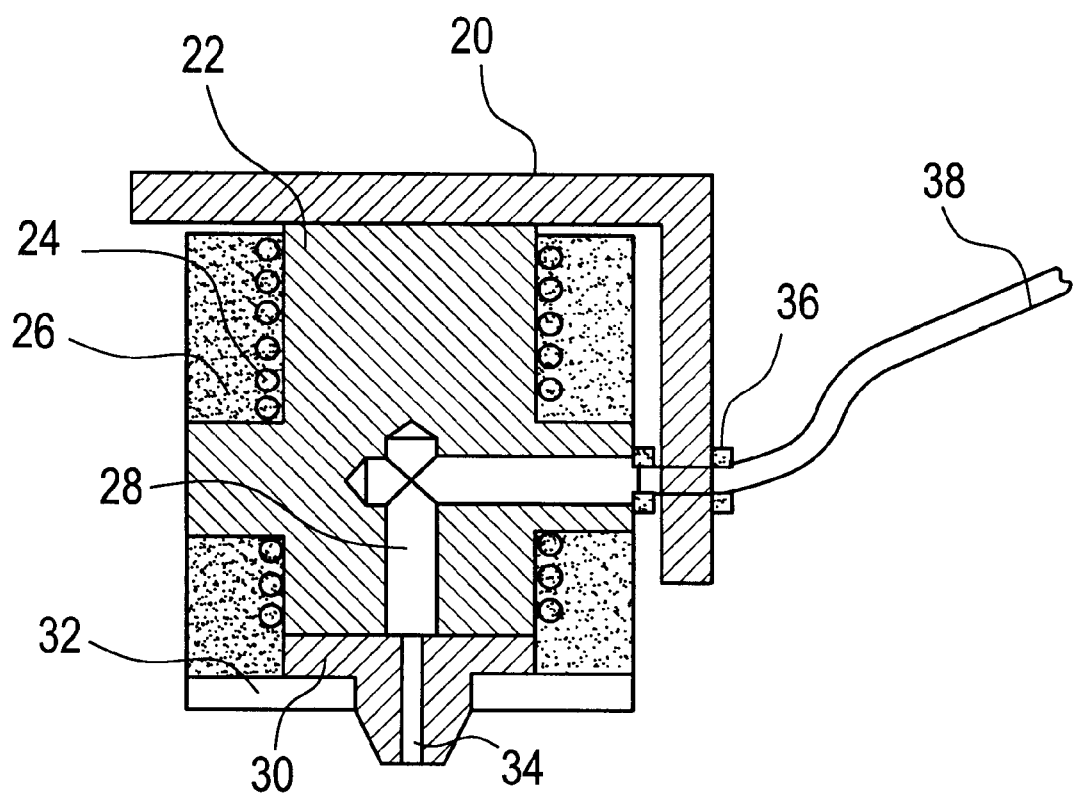
FIG. 5A is a cross-sectional view of the continuous depositing nozzle.
Figure 5B:
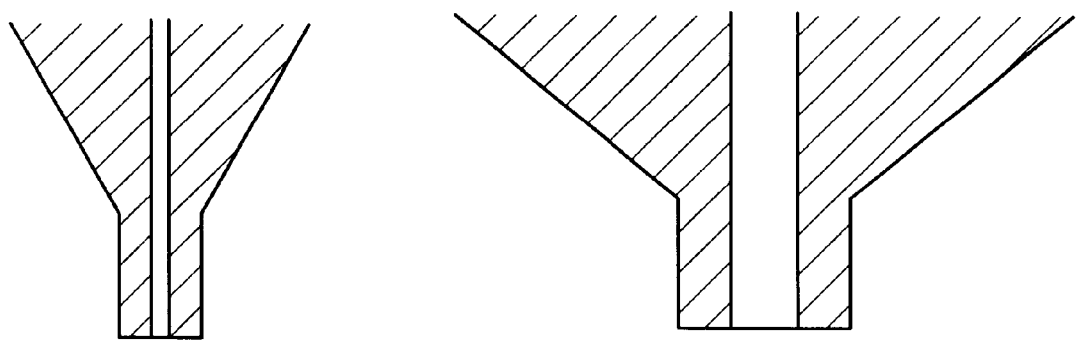
FIG. 5B is the cross-sectional views of the fine tip used to deposit boundaries and the thick tip used to deposit the interiors of the layers of ice part.

To prevent the water in the transmission pipe and working nozzle from freezing, heating device 24 is utilized as shown in FIG. 5A. The water in the nozzle and transmission pipe 38 is kept at a temperature slightly higher than the freezing point, eg. 5° C. The water comes from the transmission pipe 38 and enters the passage 28 then enters the tip passage 34 which is much narrower. The diameter of the tip passage can range from 0.2 mm to 2 mm depending on the line width requirement. Assembling piece 20 is used to mount the nozzle to the scanning mechanism. Some heat insulation material 26 and insulation piece 32 are used to prevent the nozzle 22 from being over cooled by the cold environment. When building an ice part, the interior portion can be built with a thicker tip in order to improve the building speed. However, the boundaries of the part should be built with finer tip in order to improve the accuracy and surface finish (see FIG. 5B). So, at least two tips are can be used to provide different building speed and accuracy for boundaries and interiors. FIG. 5C shows a nozzle with two tips. Tip 48 is selected by controlling the electromagnet 44. When the left electromagnet is on, the nozzle 42 will be attracted causing the nozzle to lean to the left around the ball bearing 40. More tips can be mounted on the nozzle in order to build colorful ice part, different portion of the part in different colors. Three tips can deposit water of three basic colors—red, blue and yellow. With these three basic color materials, the ice part can be built with many other colors by controlling the mixing ratio of the three colors.

Figure 6A:
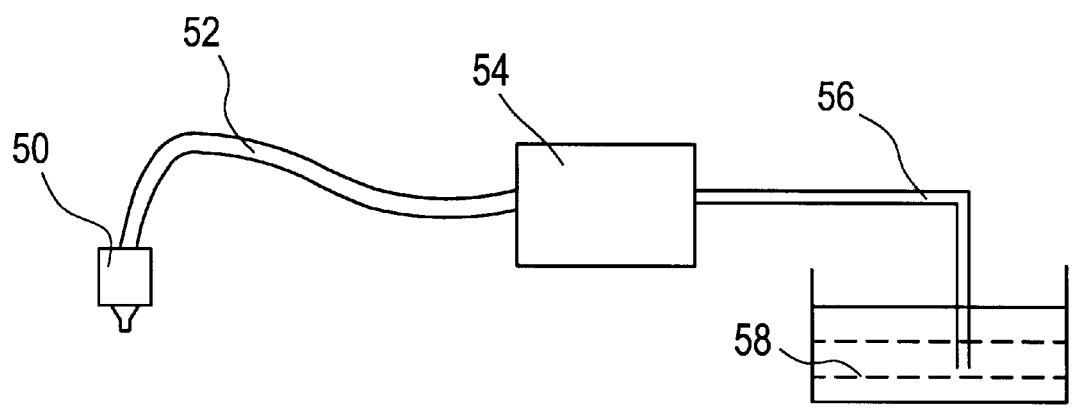
FIG. 6A is a diagrammatic illustration of the method of squeezing water with a peristaltic pump.
Figure 6B:
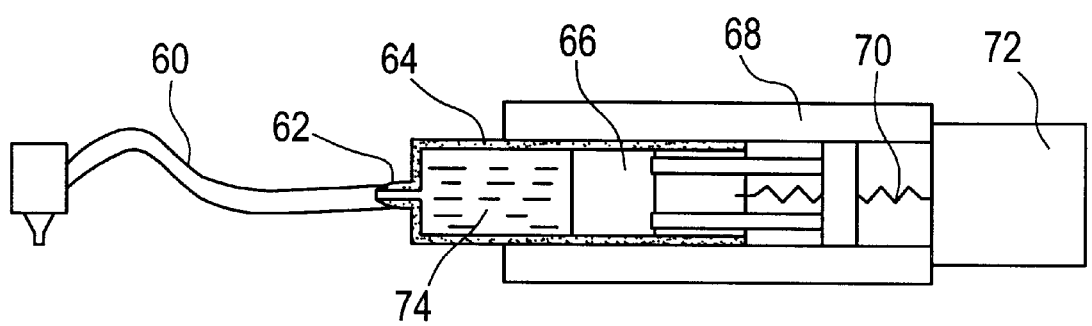
FIG. 6B is a diagrammatic illustration of the method of squeezing water with a cylinder driven by a motor.

There are at least two ways to squeeze the material to the nozzle. FIG. 6A is the method of using a peristaltic pump while FIG. 6B is a method of using cylinders driven by a motor. In FIG. 6A, the peristaltic pump 54 forces the water in reservoir tank 58 to working nozzle 50 along the input pipe 56 and the output pipe 52. In FIG. 6B, the piston 66 is driven to move in the cylinder 64 parallel to the actuator by motor 72 and the screw 70. The movement of the piston squeezes the water 74 in the cylinder 64 to go into the pipe 60 through joint 62.

Figure 7:
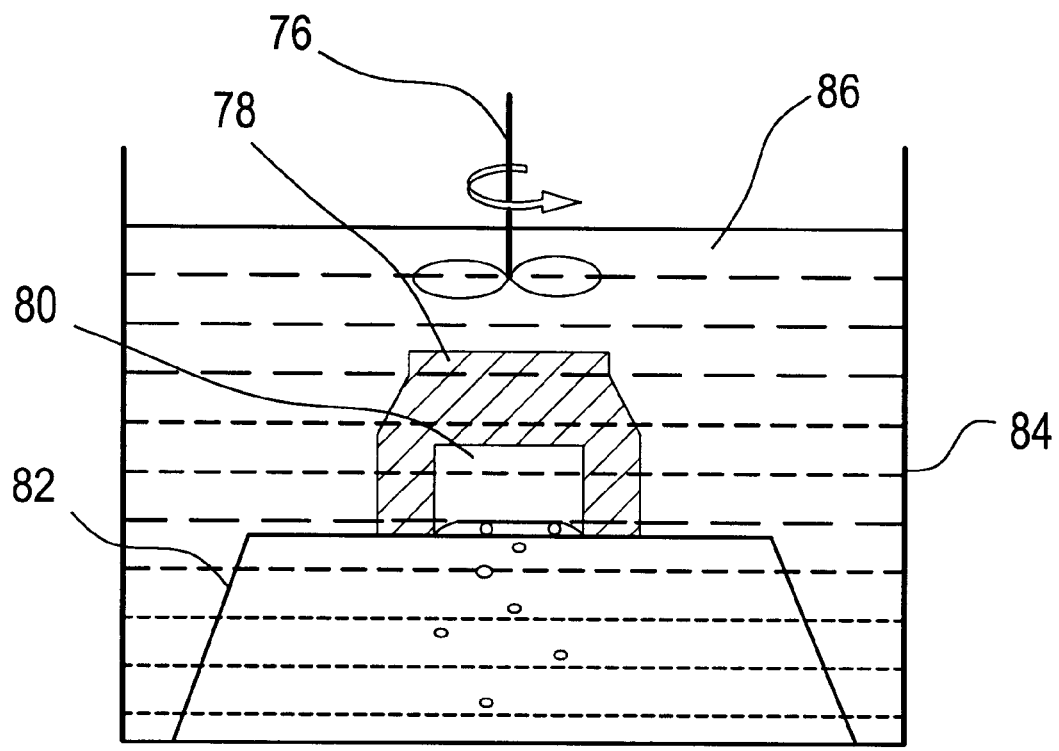
FIG. 7 is a diagrammatic illustration of a device used to automatically remove the support of the ice part with specially selected solution.
Figure 8:
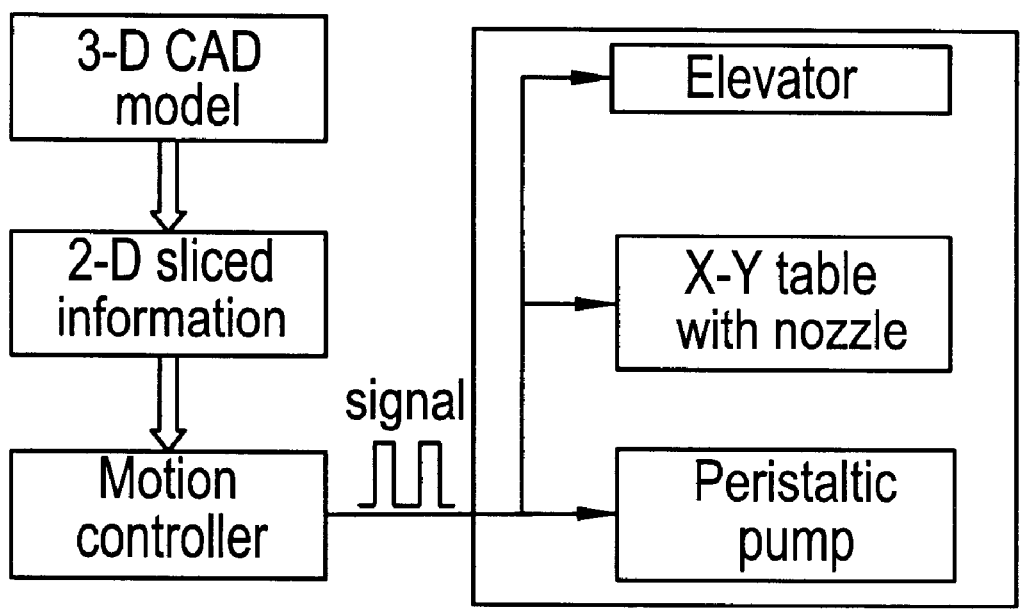
FIG. 8 is a functional block diagram of a control system of the present invention.
Figure 9A:
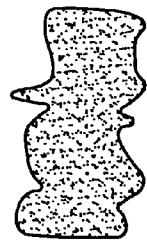
FIG. 9 is a diagrammatic illustration of a material discharged from a continuously depositing nozzle of the present invention.
Figure 9B:
Figure 9C:

The support of the part is made of brine, a mixture of water and salt having a melting point lower than that of pure water. When the building finishes, the part with support is put on the bracket in oil 86 contained in vat 84 as shown in FIG. 7. The oil is kept at a temperature slightly higher than the melting point of brine ice but lower than the pure ice. So, the support 80 will gradually melt and fall down to the bottom of the vat because of larger density of brine than oil. The part 78 is unchanged, still in solid state. A blender 76 is utilized to accelerate the support removal procedure. After support removal, the part is obtained, ready for visualization, soft tooling or sand casting.

Building Strategy

Contours and interior fillings of each layer of the ice part are built with different nozzle tips. In order to build the ice parts with good accuracy and surface finish, the contours are built by depositing material with a smaller aperture tip, typically 0.3 mm in diameter. However, the interior fillings are built by depositing with a larger aperture tip to improve the building speed. The properties which make this building strategy possible include almost no heat accumulation, natural binding of layers and excellent fluidity.

Figure 11A:
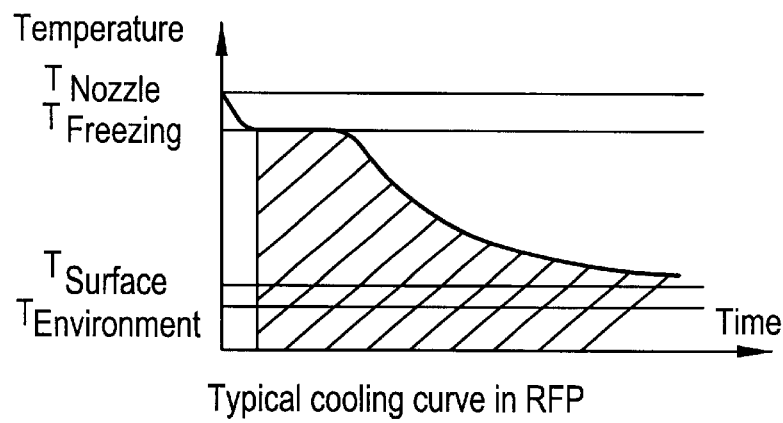
FIG. 11 is a chart illustration of a comparison of cooling procedures for crystalloid materials having a low heat conductivity versus non-crystalloid materials.
Figure 11B:
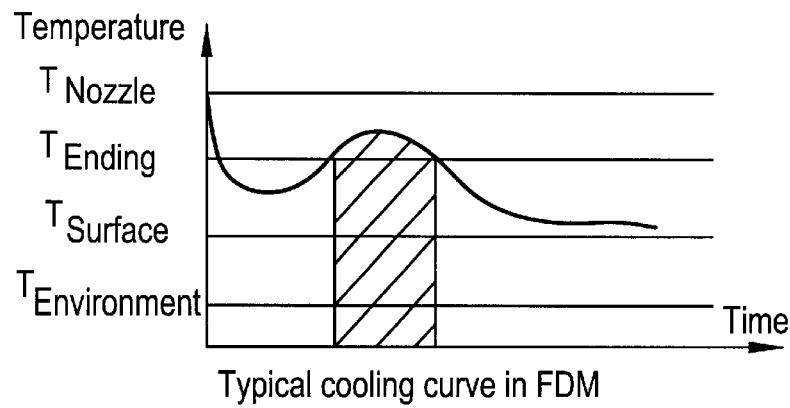

With reference to FIG. 11, when the RPF cooling procedure is compared with conventional rapid prototyping approaches, the benefits of non-heat-conductive crystalloid materials can be appreciated. As shown the ambient temperature of conventional SFF prototyping rises as more and more layers are added. This can cause deformations in the prototype shape and problems with respect to curing time. A significant advantage is achieved from non-conductive crystalloid material in that the temperature at which the material transitions can be predicted and easily controlled. Because the temperature at which the material returns to a solid state can be predicted, various crystalloid materials with different threshold temperatures can be used to attain models in which portions or support and building materials can simply be melted away to achieve prototype design that were not possible using conventional compounds.

Application of Ice Patterns

All applications of ice patterns are faced with the problem of low operating temperature. This indeed makes application more difficult. However, in some cases, this problem can be solved or the advantages of RFP are dominant factors. The following describes some of the proper advantageous RFP applications.

1. Visualization

RFP can easily build colorized and transparent ice parts. This feature is very important in some cases. For example, a model of diseased organ can help the surgeon to prepare the operation better. By utilizing RFP, a colorized ice model can be made with the CT scanning information, different portions in different colors. This colorized ice model can help the surgeon to get more information and better understanding about a disease focus. The transparent feature of the ice model makes it possible to see the internal structure of the ice model of the diseased organ.

2. Rapid Tooling

RTV silicone rubber molding is one of the most popular Rapid Tooling technologies. Through experiments it has been discovered that silicone molding with ice patterns at low temperatures is feasible. A major disadvantage is that it takes longer time for the silicone (2-composite mixture) to cure at subfreezing temperatures. However, easy pattern removal is a great advantage of RFP in case the part is complex and the accuracy is critical. In this case, after the silicone mold cures, the ice pattern can be removed from the silicone mold by simply melting ice and drying the mold instead of physical removal, and thus an accurate complex part can be duplicated very rapidly. The procedure following formation of an ice prototype in the system described above includes preparing the silicone by mixing and cooling; pouring the silicone over the material and quickly degas the silicone; allowing curing at a temperature that is below the threshold freezing temperature for the material; removing the material; pouring degassed urethane; and removing the urethane part.

An alternative approach uses UV curable silicone to replace the 2-composite silicone. In this approach, the material only reacts to UV radiation. The temperature, is no longer an important factor for curing speed. Another advantage of this approach is that the curing speed is much faster than traditional silicone curing systems.

This invention is also disclosed in the paper "Rapid Freezing Prototyping with Water" by Wei Zhang, Ming C. Leu, Zhiming Ji and Yongnian Yi (unpublished) and in the briefing slides "Rapid Freezing Prototyping" by Wei Zhang dated Apr. 3, 1998 (unpublished). Both of these papers are included herewith, incorporated herein by reference in their entireties, and attached hereto as "Appendix A" and "Appendix B" respectively.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A system for use in rapid freezing prototyping, using at least two crystalloid materials capable of transitioning between liquid and solid states at a threshold temperature, said system comprising:

a material supply subsystem and a material deposition subsystem in fluid communication with said supply subsystem;

a three-dimensional spatial positioning subsystem connected to said material deposition subsystem and operative to position said material deposition subsystem at a plurality of points within a predetermined region; and a freezing chamber having an interior region defining said predetermined region;

whereby said material supply subsystem directs said material in said liquid state to said material deposition subsystem; said positioning subsystem adapted to position said material deposition subsystem at one of said points; said material deposition subsystem adapted to maintain said material at least one liquid state temperature proximate to said threshold temperature and depositing said material within said freezing chamber; said chamber causing said material to have a solid state temperature by lowering the temperature of said material from said liquid state through said threshold temperature to said solid state temperature; and said material supply subsystem is adapted to supply a first and second crystalloid material having a first and second threshold temperatures respective; and said material deposition subsystem is adapted to maintain said first material at a first liquid state temperature and said second material at a second liquid state temperature;

such that said two crystalloid materials form first and second layers respectively.

2. The system of claim 1 including a computer having a computer-aided-design program operatively connected to control said material supply and deposition subsystems; said positioning subsystem and said freezing chamber thereby automatically forming said at least one layer.

3. The system of claim 2 wherein said computer causes sufficient material to be deposed to form a prototype.

4. The system of claim 1 including a support removal subsystem for removing at least one layer from said freezing chamber.

5. The system of claim 1 for use with first and second materials having first and second colors wherein:

said spatial positioning subsystem cooperates with said material deposition subsystem to form a first layer of said first color and a second layer of said second color.

6. The system of claim 1 for use with said first and second materials having said first and second threshold temperatures respectively where said first threshold temperature is greater than said second threshold temperature said system including:

a support removal subsystem for removing said at least one layer from said freezing chamber by raising said solid state temperature to be greater than said second threshold temperature and less than said first threshold temperature; such that said second material is returned to said liquid state.

7. A method of rapid freezing prototyping using a system having a material supply subsystem, a spatial positioning subsystem, a freezing chamber, a material deposition subsystem in fluid communication with said material extrusion subsystem with at least one crystalloid material capable of transitioning between liquid and solid states at a threshold temperature, said method comprising the steps of:

directing said material in said liquid state through said material supply subsystem to said material deposition subsystem; maintaining said material in said material deposition subsystem at least one liquid state temperature proximate to said threshold temperature positioning said material deposition subsystem with said material using said spatial positioning system;

depositioning said material within said freezing chamber;

lowering said material in said chamber from said liquid states temperature through said threshold temperature to a solid state temperature thereby forming said material into at least one layer of material;

wherein said material supply subsystem is adapted to supply a first and second crystalloid material having a first and second threshold temperatures respective; and said material deposition subsystem is adapted to maintain said first material at a first liquid state temperature and said second material at a second liquid state temperature;

such that said two crystalloid materials form first and second layers respectively.

8. The method of claim 7 including the steps of:

removing said at least one layer from said freezing chamber by means of a support removal subsystem casting a mold from said at least one layer by means of a cold casting assembly.

9. The method of claim 7 wherein said steps of directing, maintaining, positioning, depositing and lowering are repeated sequentially in a predetermined number of cycles; and said positioning step includes moving incrementally said material deposition subsystem a predetermined distance during each of said cycles to form a plurality of layers;

such that said layers in combination form a prototype.

10. The method of claim 9 wherein said moving step moves said material deposition subsystem in a continuous manner with said depositioning step so as to cause said plurality of layers to be a continuous extrusion which over many cycles forms said prototype.

11. The method of claim 9 including the step of assembling said plurality of layers to form said prototype.

12. The method of claim 9 wherein said moving step moves said material deposition subsystem in discrete increments in sequence with said depositioning step so as to cause said plurality of layers to be formed from discrete droplets which over many cycles forms said prototype.

* * * * *